Figure 1:
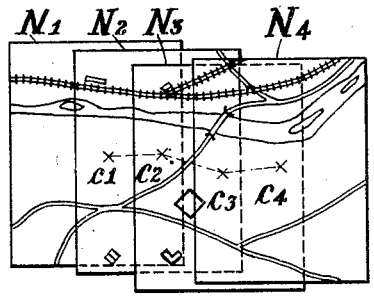

May 23, 1933.  E. H. CAHILL  1,910,425
METHOD OF MAKING MAPS
Filed July 26, 1928   5 Sheets-Sheet 1

Inventor:
Edward H. Cahill.
by Francis D. Chambers
his Attorney

Inventor:
Edward H. Cahill
by Francis D. Chansley
his Attorney

May 23, 1933.  E. H. CAHILL  1,910,425
METHOD OF MAKING MAPS
Filed July 26, 1928   5 Sheets-Sheet 3

Inventor
Edward H. Cahill
by Francis C. Chamberlin
his Attorney

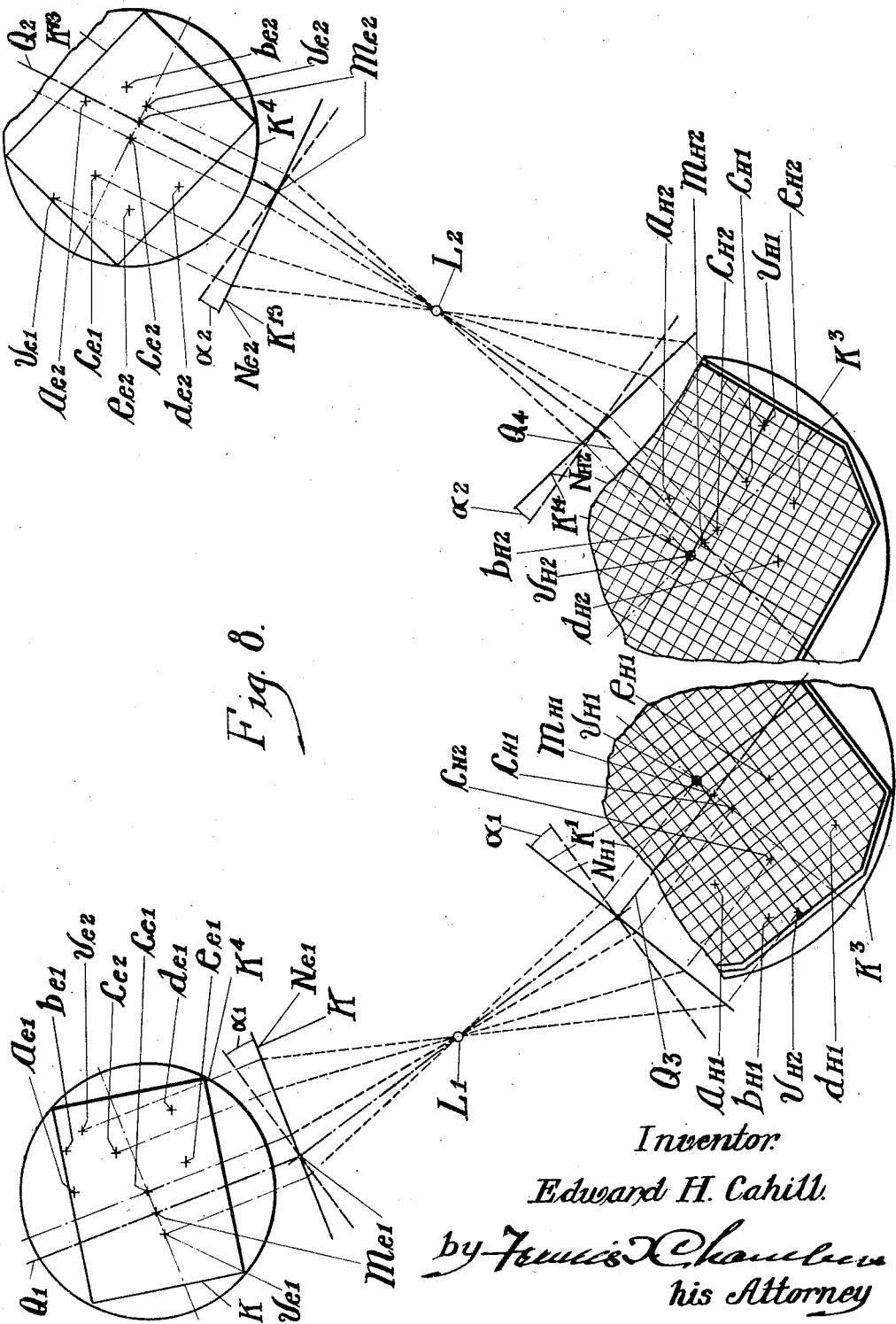

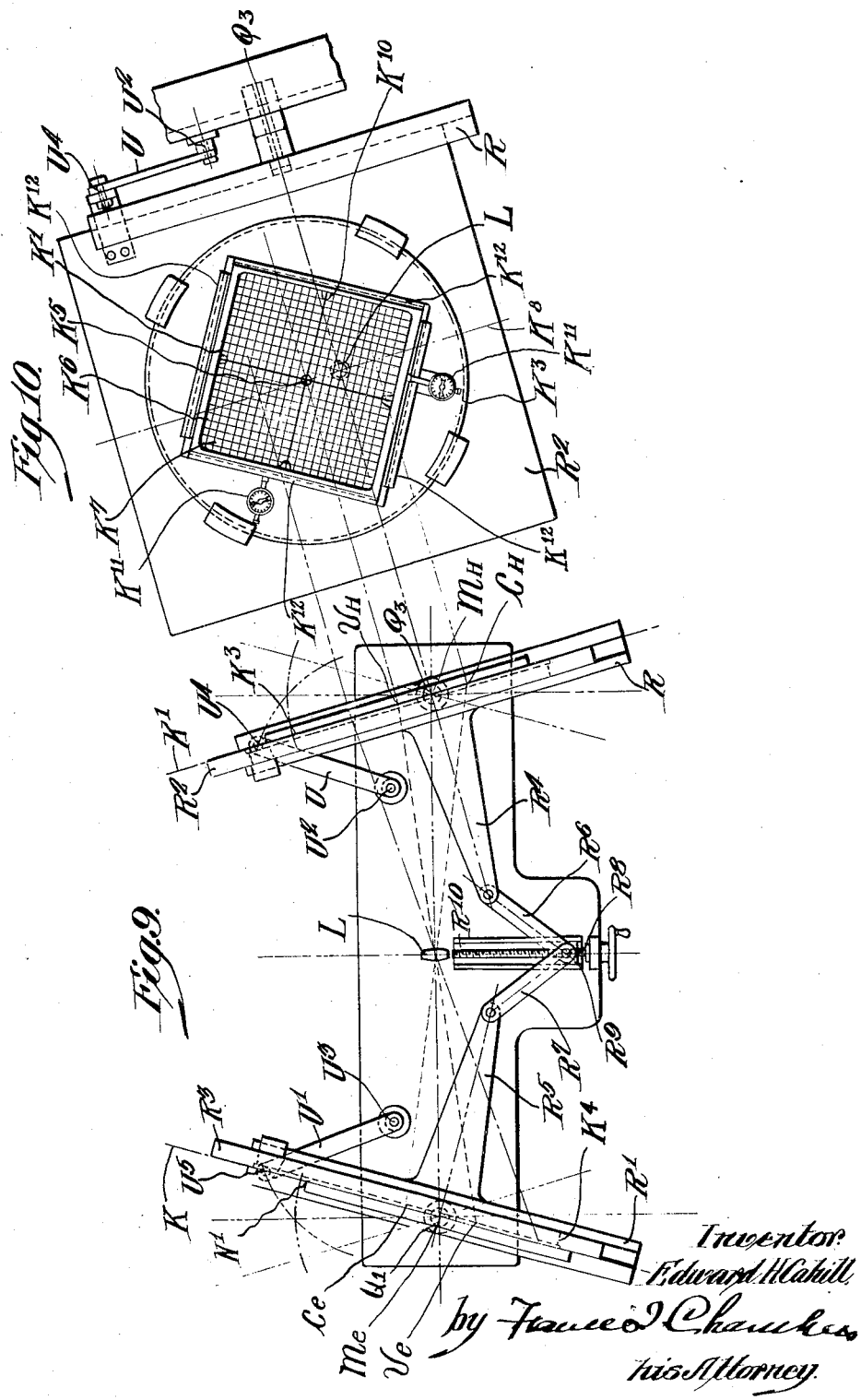

Patented May 23, 1933

1,910,425

UNITED STATES PATENT OFFICE

EDWARD H. CAHILL, OF PHILADELPHIA, PENNSYLVANIA, ASSIGNOR TO BROCK & WEYMOUTH, INCORPORATED, OF PHILADELPHIA, PENNSYLVANIA, A CORPORATION OF DELAWARE

METHOD OF MAKING MAPS

Application filed July 26, 1928. Serial No. 295,453.

My invention relates to the method of compiling orthographic maps from a series of photographs taken from a moving aerial vehicle, such as an aeroplane, in which method a series of overlapping photographs are taken of the territory to be mapped, a series of overlapping stereoscopic pairs of views are selected showing in part the same territory, the location on each view of each center point and the conjugate center point of its companion view is definitely located and the relative heights of salient points appearing in each pair of views is measured on the ground. In this method a basis for the computation of the scale of the map is provided by including in the series of photographs two objects at a known distance apart.

An essential feature of the process is the reprojection of tilted photographic plates in such a way that the reprojected views will show parallax differences coinciding with the calculated parallaxes of the salient points, which can only be the case when the reprojections are equivalent to views taken with vertical lens axes. In this known process, it is the practice to place the stereoscopic views in a measuring stereoscope for the definite ascertaining and marking on each view of its center point and the conjugate center point of the companion view, thus determining the line of flight and for ascertaining in a general way by measurement of apparent parallaxes some approximation to the line and angle of tilt of the plate at the time the picture was taken.

In the known process, the preferred method for obtaining reprojections of the tilted views equivalent to those taken with a vertical lens axis was to utilize the plate which through the stereoscopic examination appeared to be approximately taken with a vertical lens axis to make therefrom a template showing the center, conjugate center and a number of salient points and then to correct the other plate by projecting it on the template and so manipulating the plate as to line and angle as to bring the projections of the salient points with correct parallax differences into registry with the template. Where this could not be done, it became apparent that the view from which the template was made must have been taken with a tilted lens axis and this plate had then to be manipulated as to line and axis of tilt so that a reprojection could be made from it more nearly approaching a view taken with a vertical axis, another template made from this reprojection and the process continued as above. The above described method of reprojecting tilted plates is capable of giving good results but in practice is found, especially where great accuracy is aimed at, to be tedious and expensive and it is particularly to the improvement of this step of the known method that my present invention relates.

In the known method, the reprojected plates are used in the preparation of a contour map of the territory shown in the pictures in the same way in which I propose to use the reprojected views prepared by my improved method.

The method briefly indicated above is that described in the United States patent to Brock & Holst, 1,565,413, dated December 15, 1925, and may be referred to hereafter as the Brock method.

The objects of my invention are to provide a more accurate, more rapid and more economical method of reprojecting the tilted photographic plates to produce reprojections which will be equivalent to photographs taken with a vertical lens axis, to produce such reprojection free from distortion to definitely locate on the reprojection the points at which a vertical from the lens intersects the ground in the taking of the original tilted picture so as to facilitate the determination of the base line on which parallax values are to be calculated and to accurately mark on the tilted pictures the location of the salient points, the relative elevations of which are measured on the ground, are used in comparing the parallax differences apparent on the pictures with the calculated parallaxes.

The leading feature of my improved method consists in simultaneously projecting a pair of the stereoscopic views, in a pair of similar projectors and manipulating the plates in the projectors as to line and angle of tilt until the projected views show parallax differences as to the points of known relative elevations compatible with the calculated parallax differences of such points and then rephotographing said so adjusted plates to produce a pair of plates equivalent to views taken with vertical lens axes and suitable for use in compiling a map of the district. In order to produce undistorted reprojections it is necessary to shift the views with reference to the tilt axis of the projector in the direction of the line of flight and in definite relation to the angle of tilt given to the views in the projector.

According to my invention, the provisions in the projector permit the correction of pictures taken by lenses of various focal lengths or of any enlargement or reduction of the original camera pictures for the reason that the required correction or tilt angles given the conjugate planes of the projectors are related to the camera inclinations by the ratio of the projector lens focal length and the camera lens focal length. If "F" be the camera lens focus, "$f$" the projector lens focus, $\theta$ the angle of camera inclination and $\alpha$ the required tilt of the projector focal planes, the above relation may be expressed by the equation $$\sin \alpha = \frac{f}{F} \sin \theta.$$

If the camera lens and projector lens are of equal focus, then $$\frac{f}{F}$$

will be unity and angle $\alpha$ will equal angle $\theta$. If $f=10''$, $F=8''$ and $\theta=1°$, then $$\sin \alpha = \frac{10}{8} \sin 1°-0' = \sin 2°-0'-1''.$$

If the camera lens focus $F=16''$, then $$\sin \alpha = \frac{10}{16} \times \sin 1° = \sin 0°-37'-30''.$$

It may be desirable to enlarge the 8'' pictures two diameters before correction. In this case the new enlargement will be equivalent to the picture taken by a 16'' lens and its correction will be the same as for the 16'' picture mentioned above.

In the method provided by my invention, the corrected pictures are of the same scale as prevails in the line of intersection of the tilted camera plane and a horizontal plane at the focal distance above the lens. The images in this line of true scale on the tilted pictures are the only ones which are not affected by the camera tilt. Therefore, as the projector planes are tilted, this true scale line is caused to simultaneously shift into the tilt axis of the object plane and the picture produced on the image screen will be of the same scale as if originally projected in the horizontal plane described above.

The amount of this shifting has already been mentioned, but it may be expressed by the equation $$\Delta = \tan \frac{\theta}{2} \times F,$$

in which $\Delta$ is the amount of shift, $\theta$ is the angle of camera inclination and $F$ the focus of the picture to be corrected. In the case of a picture taken with an 8'' lens and enlarged 2 diameters, F would be 16''; this principle applies also to reduction in size.

In the operation of my invention the need of considering and computing the camera tilt and the distance of shift is eliminated, and only the tilt of the projector planes need be considered. The tilts are readily determined from standard data in conjunction with the operator's knowledge of characteristics of tilted plates.

Further means for marking points are provided in a measuring stereoscope, so that on each plate, conjugate images may be precisely marked by perforations when brought in the intersection of the cross-hairs in the eyepieces of the optical system.

My invention and the preferred way of its application will be best understood as described in connection with the following drawings in which:—

Figure 1 is a diagrammatic plan view of four overlapping aerial photographs, in which the axial points, or optical centers, of each succeeding view is represented in the preceding view, and in each of which views appear a number of salient points of which the relative elevations are determined by measurement on the ground.

Figure 2:
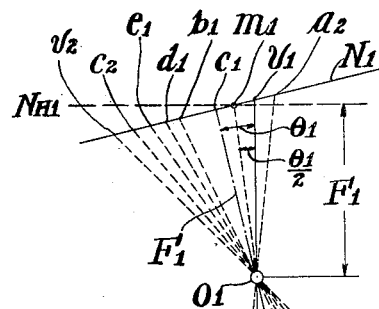
Figure 2:
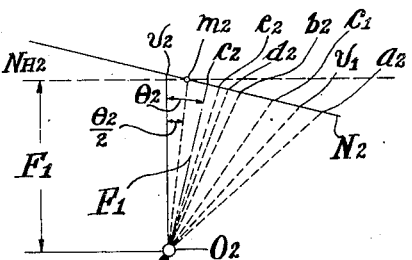

Figure 2 represents two pictures, partly of the same territory taken in an aeroplane in flight; one exposed at $O_1$ and the other as the plane reached $O_2$. At the moments of exposure the camera was inclining to the horizontal planes $N_{H1}$ and $N_{H2}$ making two tilted pictures $N_1$ and $N_2$. Lines $V_1 O_1 v_1$ and $V_2 O_2 v_2$ represent verticals passing through the lens to the focal planes and perpendicular to the ideal horizontal planes $N_{H1}$ and $N_{H2}$, and lines $C_1 O_1 c_1$ and $C_2 O_2 c_2$ show the positions of the optical axes at exposure. The points $m_1$ and $m_2$ represent the end views of the lines of intersection of the horizontal and tilted planes; said intersections are the lines of true scale of their respective pictures. The lines $O_1 m_1$ and $O_2 m_2$ are the bisectors of the angles $\theta_1$ and $\theta_2$ respectively. $F_1$ denotes the focus of camera lens.

Figure 3:
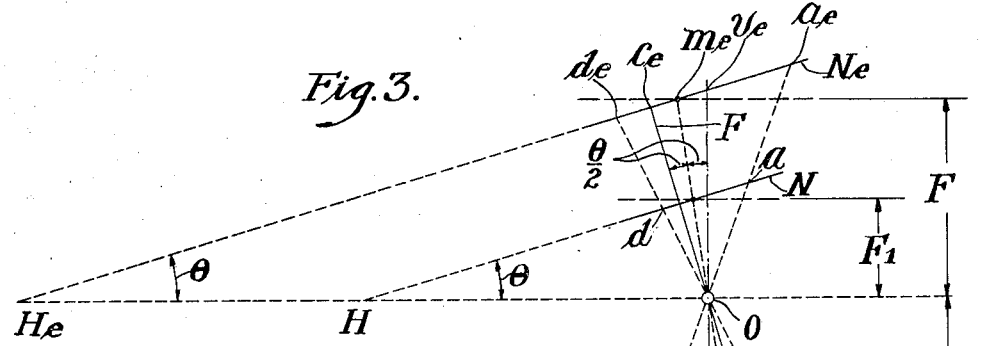

Figure 3 is a diagram representing a tilted picture N taken with a lens of focus $F_1$ and another $N_e$ taken with a lens of the focus F, both tilted through the angle $\theta$ from the horizontal and taken from the same view point. The diagram illustrates that the picture $N_e$ is equivalent to an enlargement of picture N. The picture planes extended will intersect the horizontal plane passing through the lens O, which intersections H and $H_e$ are the horizon lines of the respective pictures. The plane $N_H$ below and parallel to the horizontal plane of the lens represents a picture as would be obtained in a horizontal plane at a distance F above the lens, except that the images are reversed 180 degrees.

Figure 4:
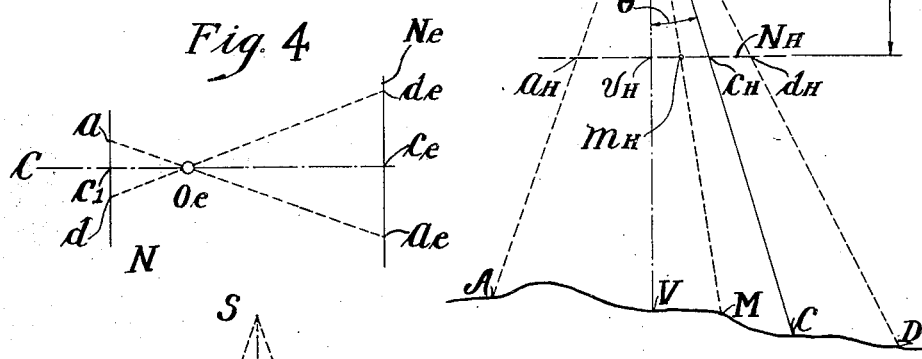

Figure 4 shows how the picture N may be enlarged to produce the equivalent of the picture in the imaginary plane $N_e$.

Figure 5:
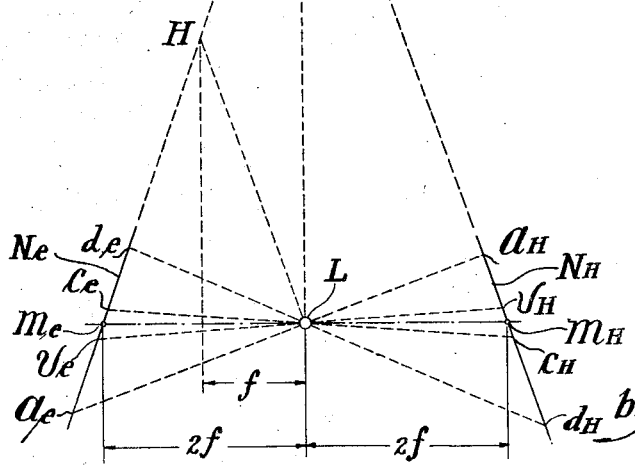

Figure 5 illustrates diagrammatically how a tilted picture is horizontalized by projecting it from a tilted plane through the lens L to a tilted image plane. The horizon line H in the extended tilted picture plane $d_e S$ is in the front focal plane of the lens, in which case the optical condition for projecting its image at infinity is fulfilled. Also, the image plane $A_H S$ is parallel to the plane of rays from the horizon line H through the lens and will receive no image of H. The diagram shows the picture $N_e$ of Fig. 4 corrected to the equivalent of picture $N_H$ of Fig. 3.

Figure 6:
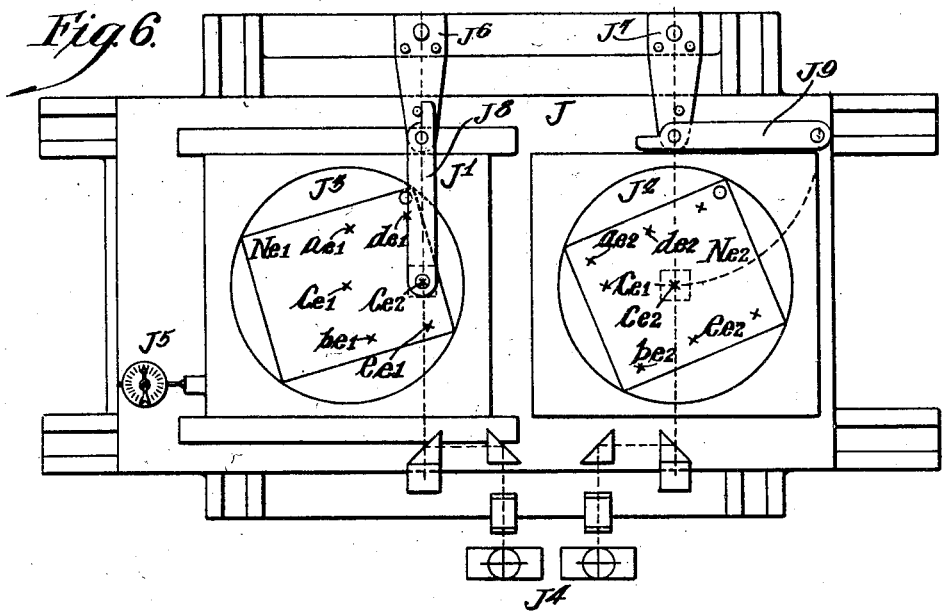

Figure 6 is a diagramatic view showing a measuring stereoscope provided with point marking devices for marking conjugate images as shown on the pictures $N_{e1}$ and $N_{e2}$. The point-markers $J^8$ and $J^9$ are rotatably mounted on their pivot brackets $J^6$ and $J^7$ respectively, so that when not in use they can be rotated from the pictures as shown by the position of $J^9$.

Figure 7:
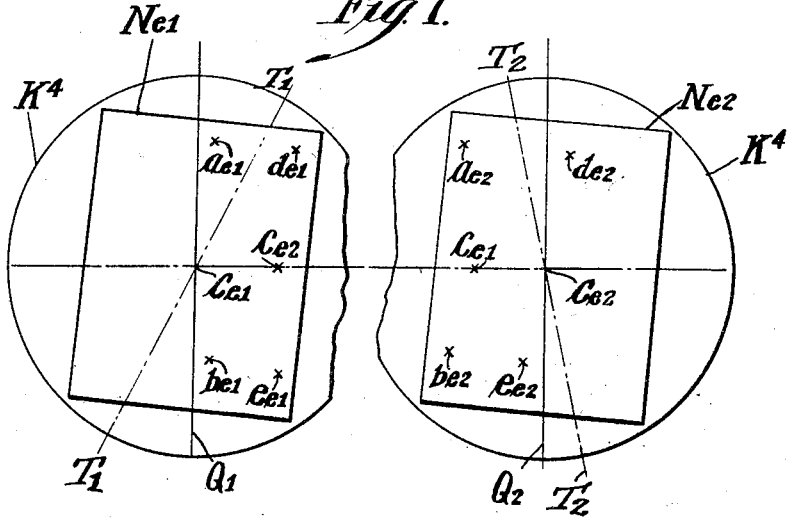

Figure 7 represents a pair of tilted pictures which have been properly marked, and of which the probable tilt angles have been determined. Also, picture $N_{e1}$ is represented as being in the plate holder of the object plane of one of a pair of duplex projectors; said plate is aligned with its apparent line of flight $C_{e1} C_{e2}$ coinciding with a line perpendicular to the axis of tilt $Q_1$ of the object plane at the point $C_{e1}$ in the optical axis of the projector. The plate $N_{e2}$ is similarly placed in the other projector of the duplex projectors, the point $C_{e2}$ in the optical axis.

Figure 8 is a diagram illustrating how two correcting projectors are used conjointly to view and measure on each image screen the projected images of the two related tilted plates for determining the desired tilt to be given each plate so that the image on each screen will be the horizontal equivalent of the tilted picture in the object plane of each projector. The figure represents diagrammatically the plan-view and two end views of the projectors; one end view showing the object planes K and $K^{13}$, and the other end views showing the image planes $K^1$ and $K^{14}$ or grid screens which lie in the image planes. The tilt axes of the object planes are $Q_1$ and $Q_2$ and the image planes tilt axes are $Q_3$ and $Q_4$. The dot and dash lines, $M_{e1}$, $M_{H1}$ and $M_{e2}$ $M_{H2}$ are the optical axes of the lenses $L_1$ and $L_2$ respectively, and are normal to the tilt axes of their respective focal planes. The other markings $A_{e1}$, $b_{e1}$, $d_{e1}$ and $C_{e1}$, also $A_{e2}$, $b_{e2}$, $d_{e2}$ and $C_{e2}$ on pictures $N_{e1}$ and $N_{e2}$ respectively, represent conjugate images of the salient ground points A, B, D and E, shown in Fig. 2.

In Figure 9 is illustrated a suitable mechanical arrangement for the simultaneous equal tilting and shifting of the picture and screen holders as applied to each one of the two projectors forming my duplex corrector. At $Q_3$ and $Q_1$ the tilt axes of the screen tilting frame R and the picture tilting frame $R^1$ respectively are indicated. $R^2$ and $R^3$ are the shifting slides operated respectively by the radius arms U and $U^1$, pivoted on the fulcrums $U^2$ and $U^3$. At $U^4$ and $U^5$ the arms U and $U^1$ are pivoted to the shifting slides $R^2$ and $R^3$. The connecting points $U^4$ and $U^5$ are, therefore, compelled to travel in arcs around $U^2$ and $U^3$ when the tilting frames R and $R^1$ are rotated around $Q_3$ and $Q_1$. The location of the fulcrum points $U^2$ and $U^3$ in connection with the length of the radial arms U and $U^1$ assures the proportionate shifting for corresponding rotation of R and $R^1$. Such rotation, which is through equal angles but in opposite directions, is obtained by means of the arms $R^4$ and $R^5$ which are rigidly connected to the tilting frames R and $R^1$ and deflected by the connectors $R^6$ and $R^7$ in co-operation with the screw $R^8$, the nut $R^9$ and its guideways $R^{10}$. The symmetry of this lever system and the central position of the guideways compel equal angular displacement of the focal planes when the screw $R^8$ is operated.

Figure 10 shows an end elevation, normal to the position of the screen $K^1$ of Fig. 9, to still more clearly illustrate the shifting of the slide $R^2$ over the tilting frame R and the turn-table $K^3$ which permits rotating the screen in accordance with the rotation of the plate in the opposite focal plane, which is supported on a turntable indicated at $K^4$, Fig. 9. On the turntable $K^3$ are guides $K^{12}$ in which the screen $K^1$ may be moved parallel to the ruled lines $K^6$ and $K^7$. When in neutral position, the intersection $K^5$ of the two main screen lines is in the axis of the turntable $K^3$, and when the tilting frames R and $R^1$ are normal to the optical axis and the screen is in neutral position, point $K^5$ will be in the optical axis. At $K^{11}$ are dial indicators that measure the screen displacement in directions parallel to the main cross lines.

To explain the operation of my invention I will consider that a number of pictures sufficient to cover the area to be mapped have been taken, similar to the four in Fig. 1, and that they have been taken with a lens of focus $F_1$. A distance has been measured on the ground to serve as a measured base, and the elevations of salient points, such as A, B, D and E of Fig. 2 have been determined on the ground.

Because of the desired scale and the accuracy of the map to be made, but not as a matter of necessity, all pictures are now enlarged equivalent to the imaginary pictures $N_e$ of focus F as shown in Fig. 3, and by the method of enlargement described in Fig. 4. By provisions in the camera I now mark on each picture its axial point or optical center as shown by $c_1$, $c_2$, $c_3$ and $c_4$ of Fig. 1. By the method described in the Brock process, the pictures are plotted to a scale derived from the measured base to orient positions of the pictures relative to each other.

Since my method of correction is the same for all pictures, I will select pictures $N_1$ and $N_2$, shown in Figs. 1 and 2, which have been enlarged to $N_{e1}$ and $N_{e2}$ respectively (Fig. 7). From the plotted control the height of the view points $O_1$ and $O_2$, Fig. 2, above a particular datum, such as point D, is determined approximately. From the lens height and the length of picture base in respect to point D, the parallaxes as relating to the elevations of salient points A, B, D and E are computed in respect to two horizontal pictures. The images of these salient points and also of the points in the optical axis $C_1$ and $C_2$ appear in both pictures.

The pictures $N_{e1}$ and $N_{e2}$ are now placed in the measuring stereoscope, Fig. 6, and aligned so that when viewed through the eye pieces $J^4$ the picture centers $c_{e1}$ and $c_{e2}$ and the conjugate images $c_{e1}$ and $c_{e2}$ all lie in a line parallel to the direction of motion permitted by the guides of slide J. By means provided in the stereoscope, point $C_{e2}$ of plate $N_{e2}$ is brought in the optical axis of the right eye-piece, which is indicated by its cross-hairs. Similarly, the conjugate image $c_{e2}$ on plate $N_{e1}$ is brought to the optical axis of the left eye-piece. The arm $J^8$ is then swung into position, adjusted so that the center of the hole coincides with the optical axis. A cylindrical tool, which fits this hole and is provided with a suitable point concentric with the outside diameter of the tool, is inserted and a tiny perforation made in the picture emulsion, thus marking precisely in the pictures the conjugate image points $c_{e2}$. Similarly, the conjugate image points $c_{e1}$ and the conjugate image points of the salient ground points are marked on both pictures $N_{e1}$ and $N_{e2}$. Henceforth, throughout correction, all measuring in respect to the images of the pictures is made in reference to these markings. The apparent parallax of the images of points A, B, D and E are now measured and the plates removed from the stereoscope. These conjugate images are $A_{e1}$, $b_{e1}$, $d_{e1}$ and $C_{e1}$, and $A_{e2}$, $b_{e2}$, $d_{e2}$ and $C_{e2}$ on pictures $N_{e1}$ and $N_{e2}$, respectively.

The apparent parallax already measured in the stereoscope is now compared with the computed parallax, and the comparison indicates that the pictures are not horizontal. From tables and charts compiled for use in conjunction with the duplex projectors, it is found that by tilting each picture $N_{e1}$ and $N_{e2}$ through particular angles, displacement on the grid screens of the marked images will occur in such amount and direction that the parallax will approach the value of the computed parallax. The plates $N_{e1}$ and $N_{e2}$ are now placed in plate holders of the object planes of the two projectors as represented by Figs. 7 and 8.

The focal planes of each projector are now brought normal to their respective optical axis. As shown in Fig. 7, the pictures are placed so that their respective optical centers $c_{e1}$ and $c_{e2}$ are on the optical axis of each projector and aligned so that the apparent line of flight $c_{e1}$, $c_{e2}$ and $c_{e2}$, $c_{e1}$ coincide with lines normal to the tilt axes $Q_1$ and $Q_2$ of the respective projectors. It has been determined that the axis of tilt of each picture is parallel to the respective lines $T_1$, $T_1$ and $T_2$, $T_2$. The turntables $K^4$ and $K^4$ supporting the plate holders are now rotated around their axes, which are in the picture centers $c_{e1}$ and $c_{e2}$ until the lines $T_1$, $T_1$ and $T_2$, $T_2$ coincide with the tilt axes $Q_1$ and $Q_2$ of the tilting frames. These lines $T_1$, $T_1$ and $T_2$, $T_2$ are not marked on the pictures, but are indicated in angular distances from the apparent line of flight of each picture.

By provisions in the projectors, as shown in Fig. 9, the tilting frame holding plate $N_{e1}$ is tilted through angle $\alpha$, around axis $Q_1$ and the one holding plate $N_{e2}$ is tilted around $Q_2$ through angle $\alpha_2$, which axes and angles are shown in Fig. 8. The images of these plates are projected on the respective equally tilted grid screens $K^1$ and $K^{14}$, and are new pictures $N_{H1}$ and $N_{H2}$, Fig. 8. Simultaneously during the tilting, the lines $T_1$, $T_1$ and $T_2$, $T_2$, not shown, have shifted from the tilt axes from the optical axes by the amounts $c_{e1}$, $m_{e1}$ and $c_{e2}$, $m_{e2}$, respectively. The points $m_{e1}$ and $m_{e2}$ have thus been brought into the optical axis of their respective projectors, and the lines of no scale change, which are parallel to $T_1$, $T_1$ and $T_2$, $T_2$, now die in the tilt axes $Q_1$ and $Q_2$ respectively, Fig. 8. During the simultaneous tilting of planes, the grid screens have also been shifted the same amounts as the respective plates, and the intersections of the two main grid lines on each screen now lie on the image of each foot point in the vertical, which are shown by $V_{H1}$ and $V_{H2}$ of Fig. 8. The conjugate image of $V_{H1}$ is found at $V_{H1}$ on screen $K^{14}$ and the screen is rotated around the axis, which lies in $V_{H2}$ until one of the center lines passes through the image $V_{H1}$, thus establishing the true line of flight. Similarly, on the other projector, the grid screen $K^1$ is revolved about $V_{H1}$ until one of the center lines passes through the point $V_{H2}$.

Using the points $V_{H1}$ and $V_{H2}$ as origins on each respective image screen, measurements of abscissa parallel to the line of flight are made of each marked image of the salient points. This is accomplished by moving the screens until the grid line nearest each image point and perpendicular to the line of flight reaches its correlated perforated image point. Such movements are measured and added to the distances indicated by the number of the equally spaced grid lines from the origin. The algebraic sums of the corresponding abscissa of the conjugate images on the respective pictures $N_{H1}$ and $N_{H2}$ constitute the picture bases in respect to the planes of the corresponding ground points. The differences between the respective picture bases constitute the parallaxes due to the difference in elevation of the corresponding ground points.

The displacement of image points caused by the tilting of the projector planes has changed the length of the picture base used in computing the original parallax; consequently the computed parallax of all the images of their corresponding ground points is now revised, and the parallax so revised is compared with the parallax measured in the projectors. If they agree, the two whole pictures $N_{H1}$ and $N_{H2}$ appearing on the grid screens are equivalent to views that would have been obtained from the same original view points $O_1$ and $O_2$, Fig. 2, if the focal planes of the camera had been in horizontal plane.

If the parallaxes determined in the projectors do not agree with the computed parallaxes, further inspection will disclose that one or both pictures must be tilted through different angles around the same axes or around different axes. However, the change in the amount of tilt and the change in the axes is small in this second operation. After this retilting the grid screens are again aligned in the real line of flight and the parallax again determined. When the parallaxes so determined agree with the parallaxes computed in respect to the same ground points and also in respect to two horizontal pictures, the new pictures $N_{H1}$ and $N_{H2}$ appearing on the two grid screens will be horizontal equivalents as already described.

During the operation of correction, due allowances have been made for parallax differences affected by the difference between the altitudes of the two view points $O_1$ and $O_2$ of Fig. 2, as will be explained later.

Leaving the focal planes of the projectors tilted in the angles determined, the grid screens are removed and replaced by photographically sensitive plates on which the new pictures $N_{H1}$ and $N_{H2}$ are made. The projectors are provided with four markers as shown at $K^{10}$ in Fig. 10, which are aligned on the two central grid lines. The images of these markers appear on the picture as small points, and the intersections of two lines joining these points locates on each picture the image of the ground point lying in the verticals passing through each view point as described by $V_1$ and $V_2$ of Fig. 2.

The second pair of pictures will be corrected similarly, using pictures $N_{e2}$ and $N_{e3}$. Since $N_{e2}$ has already been corrected, the operation remains to find the tilt angles necessary to tilt the projector holding plate $N_{e3}$. When earth curvature is effective, picture $N_{e2}$ is tilted the required small angle to correspond with the correction of $N_{e3}$.

After correction the pictures are used in plotting a more accurate control, made possible because on the pictures radial lines from the $V_{H1}$ and $V_{H2}$ point to any number of images on their respective pictures will form correct horizontal angles. The pictures are then placed in a stereoscope, where the contour lines and all other detail are drawn.

In determining the contours in the stereoscope, the corresponding parallax values are based on equal elevation of the two view-points $O_1$ and $O_2$, (Fig. 2) of the pair of pictures. Since it is practically impossible to guide an aeroplane at a constant altitude, the elevations of the two viewpoints will vary. A relatively small difference in height will cause a considerable variation in parallax, resulting in very erroneous contours. In the correction process this elevation difference can easily be detected on the screen by measuring the ordinates of images, i. e., the perpendicular distances of the conjugate images from the line of flight. The ratio of the ordinates of a pair of conjugate images, one on each plate, is a measure of the difference in altitude of the two view points. In reference to a plane of any salient ground point, one of the pictures may be enlarged or reduced, and the abscissæ of the plates so treated will be correspondingly reduced or enlarged, affecting the required correction of parallax values. This enlarging is not necessarily done during actual correction; it is necessary only that the abscissa of the plate be multiplied by the enlargement factor. The relation between the ordinates of pairs of conjugate images of respective salient points is observed during the correction of the pictures in the duplex projectors; and measurements of the ordinates may be readily obtained on each of the grid screens $K^1$, $K^{14}$ through the grid lines parallel to the line of flight, supplemented by the corresponding dial indicator $K^{11}$ in a manner similar to that in which parallaxes are measured as hereinbefore pointed out.

After correction the plate must be uniformly enlarged or reduced as is necessary before contouring in the stereoscope. If view point $O_1$ is higher than $O_2$ it will be necessary to enlarge the corrected picture $N_{H1}$. However, a constant enlargement factor will be correct only if the ground is level or of moderate relief. In mountainous regions the contours will be drawn from a pair of plates, one of which will require one or more enlargements. The contours will be drawn within the datum range for which the enlargement is given, and then another enlarged plate of the same corrected picture is placed in the stereoscope and the contouring continued above or below the datum plane already contoured. However, only in very mountainous regions and when the distance of the lens above the ground is relatively small will more than one enlargement be required.

After the plates are contoured the effect of perspective is removed by tracing the detail which has been proportionally enlarged or reduced in size so that all detail traced is of constant scale. This tracing process is described in the U. S. Patent 1,612,800 and is to be distinguished as different from the process of enlarging for correction of the parallax values for contouring as already described.

The detail so traced from each picture is compiled in its correct position on the plotted control, thus forming a map.

Having now described my invention, what I claim as new and desire to secure by Letters Patent is:

1. In the method of making maps from a series of overlapping photographs taken from a moving aerial vehicle, in which the relative elevations of salient points appearing in a pair of overlapping views are ascertained, the parallaxes of such points as they should appear in the views if said views were taken with vertical lens axes computed and the views projected with such adjustment of position as will make the projection show parallaxes corresponding with the calculated parallaxes, the improved steps which consist in placing each one of the overlapping views to be corrected in one of a pair of similar correcting projectors, manipulating the views in said projectors as to line and angle of tilt until the projections of the views jointly show parallaxes compatable only with horizontal projections of said views, then exposing these projections on sensitized plates to produce thereby the horizontal equivalent of each of the original plates of a stereoscopically related pair of aerial views.

2. In the method of claim 1, the further step which consists of bringing the line of true scale of each view into the axis of tilt thereof by displacing each one of the views in a direction normal to the axis around which angular adjustments have been made to them in functional proportions to their angular adjustments.

3. In the method of claim 1, the further steps which consist in stereoscopically ascertaining in a pair of overlapping view plates the location of conjugate images of points the elevations of which have been determined in the field, perforating the emulsion in such points on the plates before inserting them in the projectors for comparison and angular adjustments as described.

4. In the method of claim 1, the further step of locating and marking on each projected view the point where a vertical line through the camera lens intersects the view, locating and marking on each view the conjugate image of the intersection point of the other view and measuring as a base line the distance between the intersection point and said conjugate point for use in calculating parallaxes.

5. In the method of claim 1 the further step which consists of displacing the image plane of a view in functional proportion to the angular adjustment of the view and thereby locating on said image plane the point where a vertical line through the camera lens intersected the view at the instant of exposure.

6. In a method of making maps from aerial photographs, which comprises correcting tilted aerial views to their horizontal equivalents as determined by the agreement of measured parallaxes of points occurring in a pair of overlapping views with parallaxes for such points compatible only with horizontal projections of the views, the steps which consist of placing each of a pair of overlapping views to be corrected in one of a pair of similar correcting projectors, tilting each view and its associated image plane, and displacing each view to thereby bring into the respective axes of tilt of said view and its associated image plane the line of true scale of said view.

7. In a method of making maps from aerial photographs, which comprises correcting tilted aerial views to their horizontal equivalents as determined by the agreement of measured parallaxes of points occurring in a pair of overlapping views with parallaxes for such points compatible only with horizontal projections of the views, the steps which consist of placing each of a pair of overlapping views to be corrected in one of a pair of similar correcting projectors, tilting each view and its associated image plane, displacing each view to thereby bring into the respective axes of tilt of said view and its associated image plane the line of true scale of said view, and correspondingly displacing each image plane to locate thereon the point where a vertical line through the camera lens intersected the respective view at the instant of exposure.

8. In a method of making maps from aerial photographs, the steps which consist of simultaneously projecting a pair of overlapping views upon a corresponding pair of image planes, and tilting each view and its associated image plane until the measured parallaxes of points appearing in the projected image of each view agree with parallaxes for said points compatible only with horizontal projections of said views.

9. In the method of claim 8, the further step which consists in longitudinally shifting each view and its associated image plane in functional proportion to their angular adjustments.

10. In a method of making maps from aerial photographs, the steps which consist of projecting a view upon an image plane, tilting said view and image plane and displacing said image plane in functional proportion to the angular adjustment thereof and thereby locating on said image plane the point where a vertical line through the camera lens intersected the view at the instant of exposure.

11. In a method of making maps from aerial photographs, the steps which consist of projecting a view upon an image plane, tilting said view and said image plane, and simultaneously shifting said view and said image plane in functional proportion to the angular adjustments thereof.

12. In the method of claim 1, the further step which consists of effecting a change in scale of a projected view to compensate for difference in elevation of the view points of said view and a companion view.

13. In the method of claim 1, the further steps which consist of effecting different changes in scale of a projected view for corresponding datum ranges to compensate for difference in elevation of view points of said view and a companion view.

14. In the method of claim 1, the step which consists of correcting parallax values to compensate for difference in view point elevations.

15. In a method of making maps from aerial photographs, the steps which consist of simultaneously projecting a pair of overlapping views upon a corresponding pair of image planes, tilting each view and its associated image plane until the measured parallaxes of points appearing in the projected image of each view agree with parallaxes for said points compatible only with horizontal projections of said views, and locating and marking on each image plane the point where a vertical line through the camera lens intersected the respective view at the instant of exposure.

16. In a method of making maps from aerial photographs, the steps which consist of simultaneously projecting a pair of overlapping views upon a corresponding pair of image planes, determining and marking on each image plane the point where a vertical line through the camera lens intersected the respective view at the instant of exposure, determining and marking on each image plane the conjugate image of the corresponding point of the other view, and measuring along lines parallel to a line joining said points of the abscissæ of the conjugate images of salient points in said views.

EDWARD H. CAHILL.